(No Model.) 2 Sheets—Sheet 1.

A. J. RUSSELL & J. A. MATTOON.
GATE.

No. 517,070. Patented Mar. 27, 1894.

Witnesses
F. M. Johnson
H. P. Riley

Inventors
Andrew J. Russell and
John A. Mattoon
By their Attorneys,
C. A. Snow & Co.

THE NATIONAL LITHOGRAPHING COMPANY,
WASHINGTON, D. C.

(No Model.) 2 Sheets—Sheet 2.

A. J. RUSSELL & J. A. MATTOON.
GATE.

No. 517,070. Patented Mar. 27, 1894.

Witnesses
E. K. Stewart
N. F. Riley

Inventors:
Andrew J. Russell,
John A. Mattoon,
By their Attorneys, C. A. Snow & Co.

UNITED STATES PATENT OFFICE.

ANDREW J. RUSSELL AND JOHN A. MATTOON, OF BRYAN, OHIO.

GATE.

SPECIFICATION forming part of Letters Patent No. 517,070, dated March 27, 1894.

Application filed February 8, 1892. Serial No. 420,738. (No model.)

*To all whom it may concern:*

Be it known that we, ANDREW J. RUSSELL and JOHN A. MATTOON, citizens of the United States, residing at Bryan, in the county of Williams and State of Ohio, have invented a new and useful Gate, of which the following is a specification.

The invention relates to improvements in gates.

The object of the present invention is to simplify and improve the construction of sliding and swinging gates, and to provide one capable of opening in either direction and adapted to be readily opened and closed, and lifted over snow or other obstructions in doing the same, and to be readily arranged at an elevated position to allow the passage of small animals.

The invention consists in the construction and novel combination and arrangement of parts hereinafter fully described, illustrated in the accompanying drawings and pointed out in the claim hereto appended.

Figure 1:
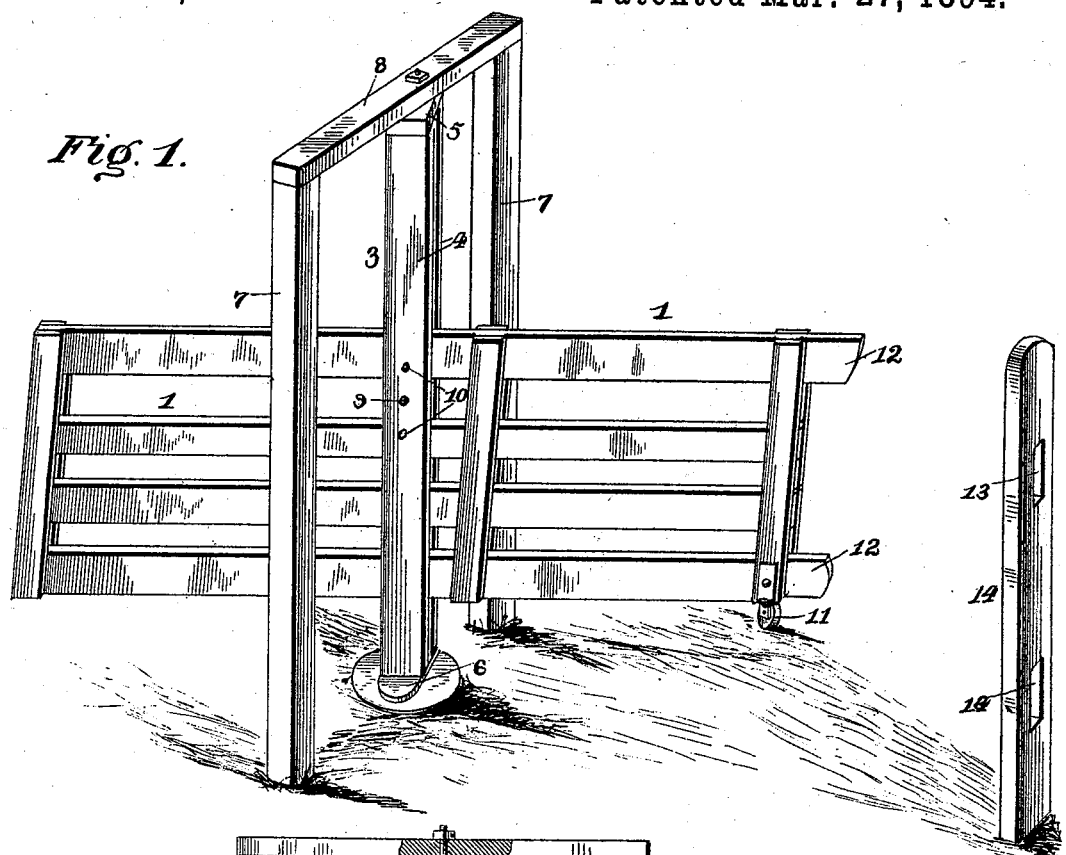
Figure 2:
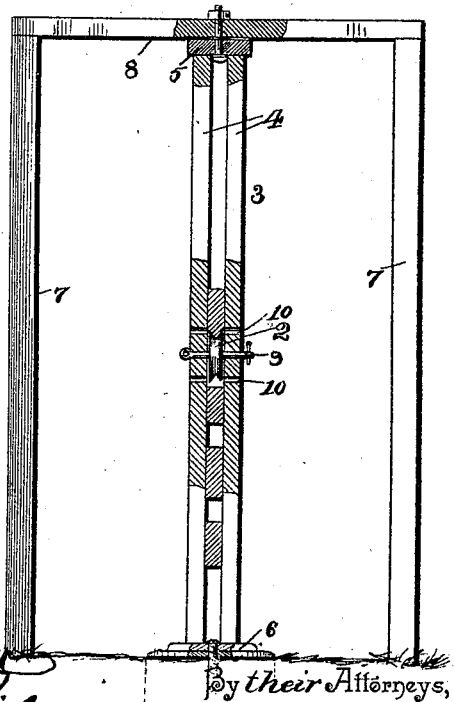
Figure 3:
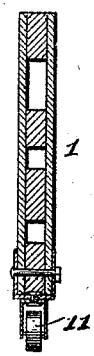
Figure 4:
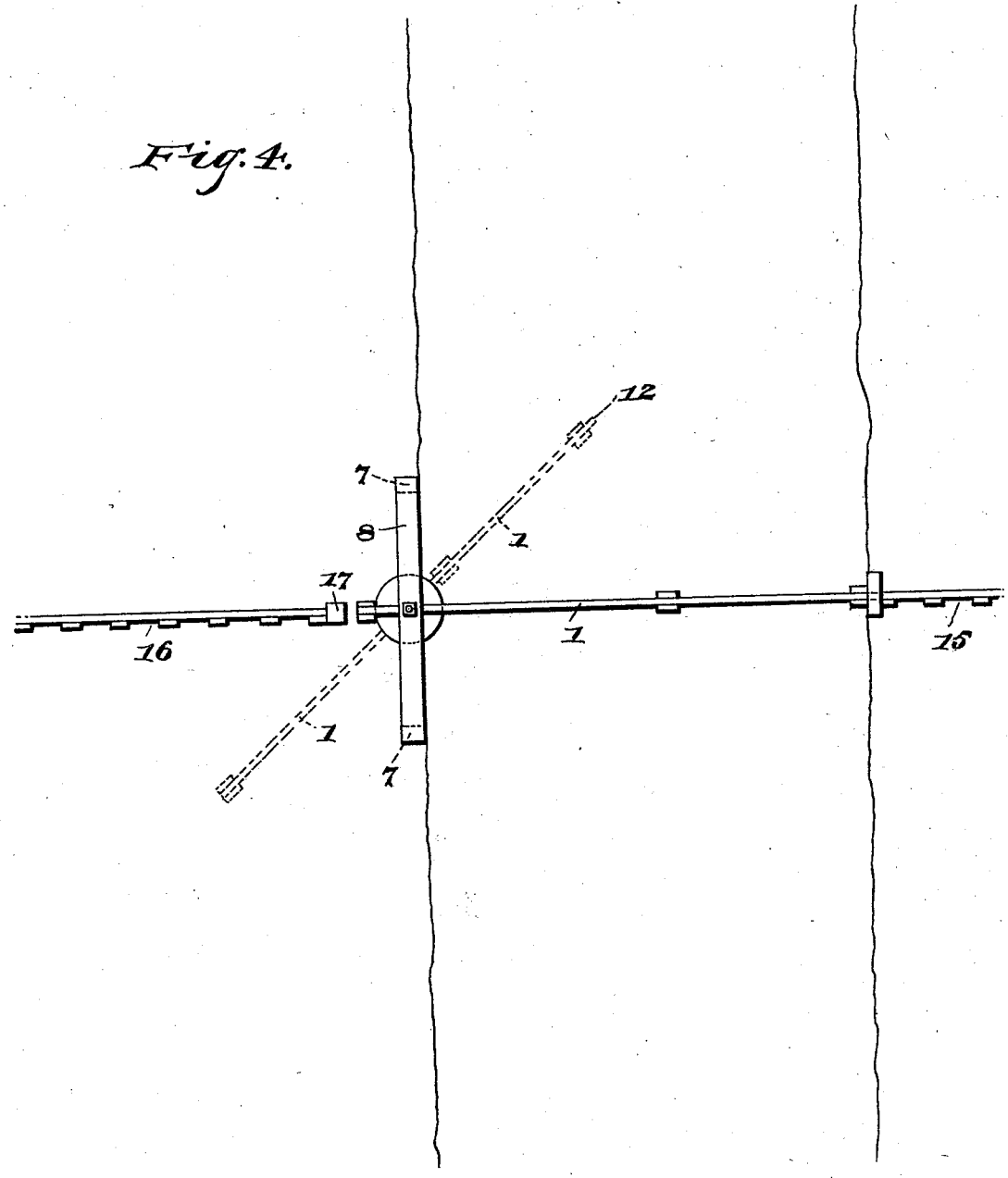

In the drawings—Figure 1 is a perspective view of the gate constructed in accordance with this invention. Fig. 2 is a vertical sectional view. Fig. 3 is a detail sectional view. Fig. 4 is a plan view showing the gate arranged with relation to a fence.

Like numerals of reference indicate like parts in all the figures of the drawings.

1 designates a sliding and rolling gate, which is mounted on a roller 2 of a pivot frame 3, and which is adapted to be partially opened by sliding, and to be turned with the frame 3 as a pivot to open it. The pivot frame 3 is composed of vertical parallel bars 4, and top and bottom connecting or crosspieces 5 and 6, and is journaled at its ends, and is supported by a main frame composed of posts 7 and a top cross-bar 8 connecting the upper ends of the posts. The roller or wheel 2 is vertically adjustable by arranging its bolt 9 in any one of a series of perforations 10, thereby enabling the height of the gate to be regulated.

The front end of the gate is provided with a swiveled caster wheel 11, which enables the gate to be rolled or moved longitudinally with ease, and also to be easily swung to either side in completing the operation of opening.

When the gate is closed, it is secured by projecting ends 12 engaging openings 13 of a latch post 14, and by engaging the lower projecting end 12 in the upper opening, the gate may be held at an inclination to provide a passage for small animals.

The sections 15 and 16 of the fence are arranged in alignment with the gate, when the latter is closed; the section 15 of the fence is located adjacent the latch post 14; and the other section 16 is arranged at the rear or inner end of the gate and terminates in a post 17. In opening the gate, which may be done in either direction, it is first turned slightly to clear the post 17, and it is then moved inward or rearward on the roller 2 to the position illustrated in dotted lines of Fig. 4 of the drawings, after which it is turned in the direction of the arrow until it lies approximately parallel with the road. The front end of the gate is sufficiently heavy to cause the caster wheel to rest upon the ground.

It will be seen that the gate is simple and inexpensive in construction, that it may be readily opened in either direction, that it may be readily lifted over obstructions, and that it may be held elevated to permit the passage of small animals, and that it slides and turns freely. Should a vehicle or the like strike the gate the latter instead of offering resistance will move with the vehicle, and thereby free itself by being swung out of the way on its pivot frame or moved longitudinally on the adjustable and caster wheels.

Changes in the form, proportion and the minor details of construction may be resorted to without departing from the principle or sacrificing any of the advantages of this invention.

What we claim is—

The combination of a sliding and swinging gate arranged longitudinally of a fence to form a continuation thereof when closed; a supporting frame arranged in a line with the roadway and at right angles to the fence and composed of a top cross-bar and vertical posts arranged a considerable distance from the gate to permit the gate to swing freely in either direction; a pivot frame receiving the gate and comprising parallel vertical bars horizontal cross-bars connecting the parallel vertical bars and pivotally mounted in the supporting frame; and a roller journaled in the pivot frame and supporting the gate, substantially as described.

In testimony that we claim the foregoing as our own we have hereto affixed our signatures in the presence of two witnesses.

ANDREW J. RUSSELL.
JOHN A. MATTOON.

Witnesses:
J. ELLSWORTH SCOTT,
GEORGE RINGS.